United States Patent [19]

Seegers

[11] Patent Number: 5,018,393
[45] Date of Patent: May 28, 1991

[54] DEVICE FOR DETERMINING TORQUE TRANSMITTED IN A SHAFT

[75] Inventor: Hanns Seegers, Herzogenaurach, Fed. Rep. of Germany

[73] Assignee: INA Walzlageer Schaeffler KG, Fed. Rep. of Germany

[21] Appl. No.: 457,239

[22] Filed: Dec. 27, 1989

[30] Foreign Application Priority Data

Feb. 21, 1989 [DE] Fed. Rep. of Germany ....... 3905251

[51] Int. Cl.⁵ ............................................. G01L 3/10
[52] U.S. Cl. ................................... 73/862.34; 384/448
[58] Field of Search ...................... 73/862.34; 340/682; 384/448

[56] References Cited

U.S. PATENT DOCUMENTS

| | | | |
|---|---|---|---|
| 3,599,482 | 8/1971 | Rundell | 73/862.34 |
| 3,751,975 | 8/1973 | Katjura | 73/862.34 X |
| 4,778,286 | 10/1988 | Kadokawa | 384/448 X |
| 4,864,231 | 9/1989 | Okumura et al. | 384/448 X |
| 4,865,468 | 9/1989 | Kato et al. | 384/448 |

OTHER PUBLICATIONS

H. K. Verma et al., "Transient Torque and Speed Meter", IE (I) Journal El., vol. 60, Dec. 1979, pp. 108-111.

*Primary Examiner*—Charles A. Ruehl
*Attorney, Agent, or Firm*—Bierman and Muserlian

[57] ABSTRACT

A device for determining the torque transmitted in a shaft, which device comprises two pick-ups arranged at an axial distance from each other on the shaft, with which sensors are contactlessly associated, characterized in that each pick-up is arranged in the immediate vicinity of an end face of a radial shaft bearing.

9 Claims, 2 Drawing Sheets

DEVICE FOR DETERMINING TORQUE TRANSMITTED IN A SHAFT

STATE OF THE ART

Devices for determining the torque transmitted in a shaft, which device comprises two pick-ups arranged at an axial distance from each other on the shaft, in particular disk-shaped pick-ups, with which sensors are contactlessly associated are known. Torques transmitted by a shaft cause a torsion of the shaft and the degree of torsion in a particular part of this shaft depends on the length of this part of the shaft, the transmitted torque, the modulus of elasticity in shear of the shaft material and the polar moment of inertia of the shaft in the part concerned. Therefore, if the other factors of influence are known, it is possible to deduce the value of the torque from the degree of torsion.

DE-PS 2,951,148 describes a device of the aforesaid kind in which two induction disks are fixed at a shaft at a given axial distance from each other. When torque is transmitted, an angular displacement of the one induction disk with respect to the other occurs in this axial length as a result of torsion. With these induction disks which act as pick-ups, coils functioning as sensors are contactlessly associated and parts of the induction disks overlap one another and the area of mutual overlap changes with an increase of the angle of torsion between the two disks. The relative torsion of the two disks can be determined by measuring the changes in the impedance of the coils caused by eddy currents induced in the disks. This angle of torsion determines the value of the torque transmitted in the given length.

The known device has the disadvantage that the two induction disks have to be arranged directly next to each other. Therefore one of the disks is fixed to one end of an additional tube which surrounds the length of the shaft under investigation and which, with its other end is fixed at the shaft. In this embodiment, the inner diameter of the tube corresponds to the outer diameter of the shaft with the result that the length of the shaft under investigation has to have a smaller diameter which, however, has to be so large that the desired maximum torque can be transmitted. As a result of this, the regions of the shaft adjacent to this measuring length are overdimensioned. Since the shaft, for example in a gear box, can be bent by additional forces, the danger exists in this embodiment that the measuring results are falsified as a result of the deflection of the shaft.

OBJECTS OF THE INVENTION

It is an object of the invention to provide an improved device of the aforesaid kind so that the danger of falsification of the measured values by deflections of the shaft is avoided.

This and other objects and advantages of the invention will become obvious from the following detailed description.

THE INVENTION

The novel device of the invention for determining the torque transmitted in a shaft, which device comprises two pick-ups arranged at an axial distance from each other on the shaft, with which sensors are contactlessly associated, characterized in that each pick-up is arranged in the immediate vicinity of an end face of a radial shaft bearing. This means that no influences on the measuring equipment as a result of deflection can occur at this location. The two pick-ups can be arranged at two shaft bearings situated at a distance from each other so that for determining the torque, a larger numerical value of the distance between the pick-ups is obtained. However it is also possible to arrange the two pick-ups at the two end faces of one shaft bearing.

The sensors can be fixed to the shaft bearing and by this, additional mounting of the sensors can be done without. Preferably, the shaft bearing forms a single structural unit with the sensors and the pick-ups so that the measuring equipment can be mounted on the shaft at the same time as the shaft bearing and supplementary mounting of the equipment is not required. Such a prefabricated structural unit has the advantage that it can be manufactured and sold as a series part.

If the shaft bearing is in the form of a rolling bearing, it is appropriate to fix the sensors at the outer bearing ring which is stationary with respect to the rotating shaft. In one embodiment of the invention, the pick-ups can be in the form of magnetic rings arranged coaxially with the shaft, each one being held in a carrier ring fixed at the shaft so that the mounting of the bearing at the shaft is done through the carrier rings. As parts of the bearing, the carrier rings can be disposed within the outer bearing ring and can have extensions angled outwards, in the regions of their bores. Due to these extensions, the length of the shaft under investigation is increased if the points of fixing of the carrier rings are located at the angled extensions.

One possibility of fixing the two carrier rings is to press them with the angled regions of their bores onto the shaft. The carrier rings are preferably located within the bearing race rims which are adjacent to the outer bearing ring. The sensors can be in the form of rod-shaped Hall emitters, each one being fixed with one end in bores of the bearing race rims, the bores being parallel to the axis, and the other end extending into an annular gap of the pick-ups formed by two coaxial magnetic rings. By this, the regions of measurement are occluded against the exterior and are thus protected. Instead of these Hall emitters, other pulse emitters can also be employed. To achieve a higher pulse sequence of measuring signals at each sensor/pick-up combination per time unit, several sensors spaced behind one another in the peripheral direction of the shaft bearing can be associated with each pick-up.

Referring now to the drawings.

Figure 1:
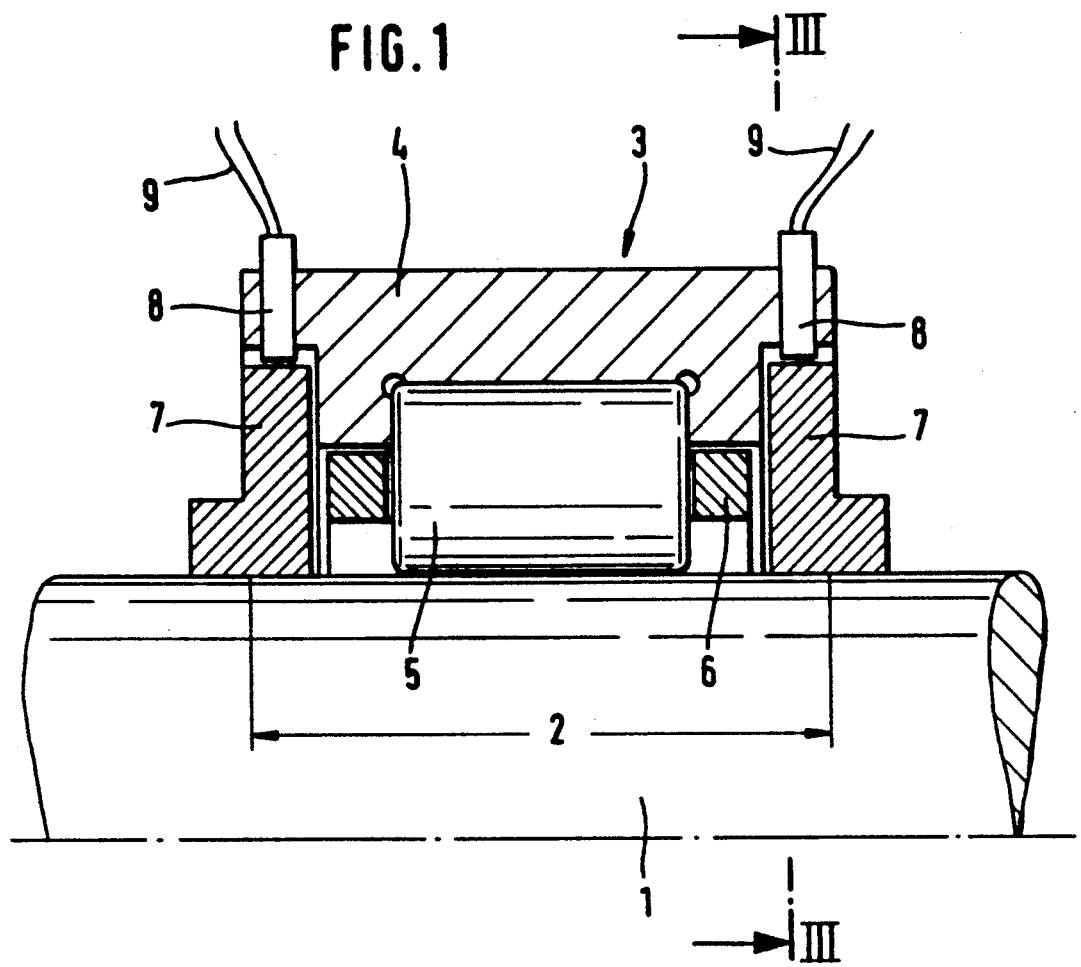
FIGS. 1 and 2 are longitudinal cross-sections of two different devices of the invention.
Figure 3:
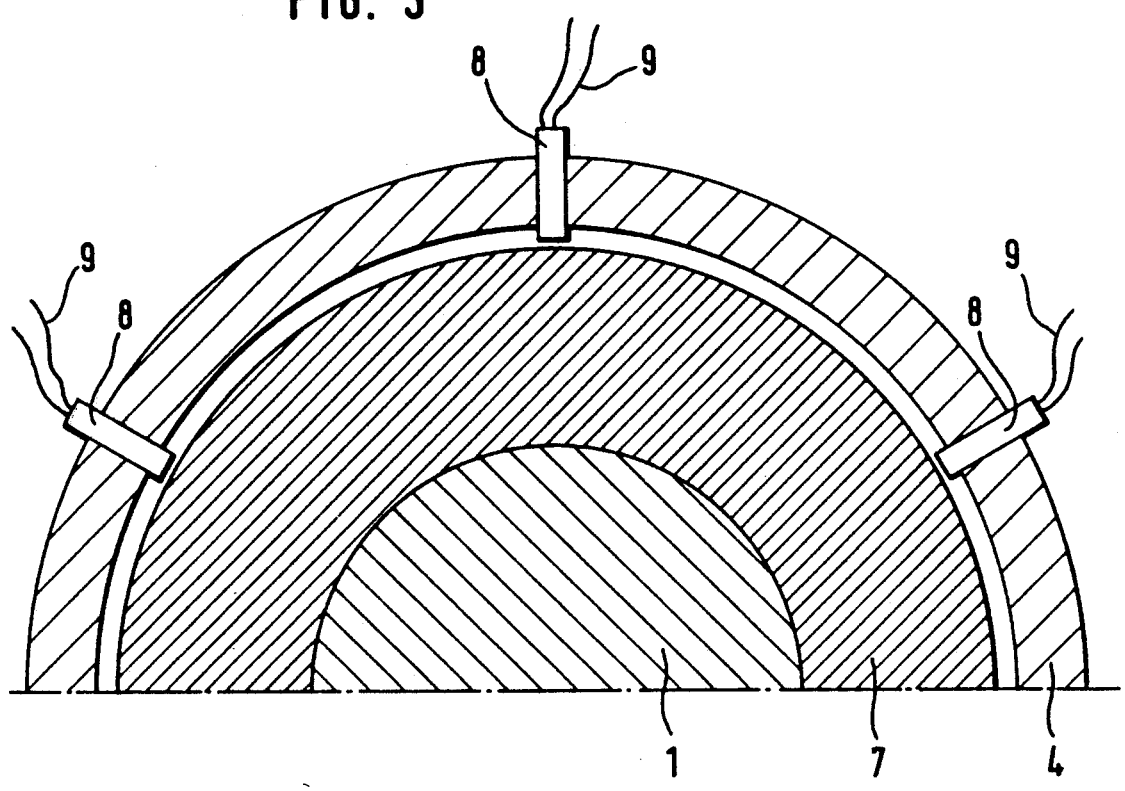
FIG. 3 is a cross-section taken along line III—III of FIG. 1.

The device of the invention in FIGS. 1 and 3 for determining the torque transmitted in a shaft 1 comprises a radial shaft bearing 3 made as a rolling bearing with an outer bearing ring 4 for cylindrical rollers 5. Outside a cage 6 for the guidance of the cylindrical rollers which roll directly on the shaft 1, two pick-ups are axially adjoined. They are disk-shaped and fixed at their inner bores on the shaft 1 with the two points of fixing determining the length of an axial distance 2. The outer bearing ring 4 has axial extensions in which sensors 8 are held and each sensor 8 adjoins a pick-up 7 radially with an air gap. The sensors 8 made as electrical components are provided with connecting cables 9 at their outer ends.

Figure 2:
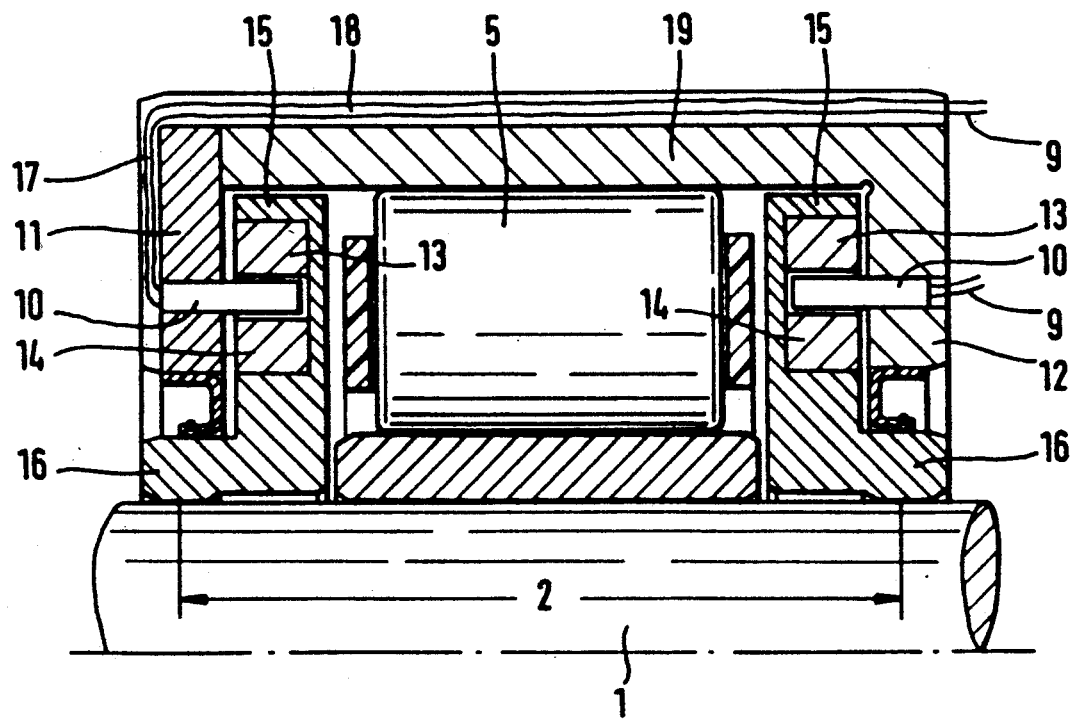

The device of the invention in FIG. 2 for determining the torque transmitted in a shaft is made up basically in the same way as the device of FIG. 1 but has sensors 10 which are held by bearing race rims 11 and 12 of the outer bearing ring 19 of the shaft bearing and extend parallel to the axis of the shaft 1. They extend from the bearing race rims in the direction of the cylindrical rollers 5 into annular gaps formed by coaxial magnetic rings 13 and 14. Here, these magnetic rings are the pick-ups whereas the sensors 10 are Hall emitters.

Each pair of magnetic rings 13 and 14 is held in a carrier ring 15 which is situated not only within the outer bearing ring 19 but also within the bearing race rims 11 and 12. The carrier rings 15 are provided at their inner diameters with bore regions 16 angled outwards through which they are fixed to the shaft 1, for example, by pressing onto the shaft 1. The points of fixing of these angled bore regions 16 define the axial distance along which the shaft 1 is investigated for determining the torque. In this embodiment, the sensors 10 and the magnetic rings 13 and 14 which act as pick-ups are completely closed off within the bearing from the environment and are thus protected. For the connecting cables 9 of the sensors 10 of one side, cable ducts 17 and 18 are provided at the bearing.

The devices of the invention function as follows: The sensors 8, 10 receive pulses corresponding to the torsion of the shaft 1 from the pick-ups 7, 13, 14 of each side of the shaft bearing and transmit these to a computer. From the pulses received, the computer determines the difference in angle between the pick-ups of the two sides. This results from the torsion of the shaft 1 and is converted into the transmitted torque. In addition, each sensor/pick-up combination can also be employed for the determination of rotational speed.

Automobile gear boxes are only one of the many possible fields of application of such a device, in which case the torque determined by the computer can for example, be used for the control of a gear-shift device.

Various other modifications of the device of the invention may be made without departing from the spirit or scope thereof and it is to be understood that the invention is to be limited only as defined in the appended claims.

What we claim is:

1. A device for determining the torque transmitted in a shaft, which device comprises two pick-ups arranged at an axial distance from each other on the shaft, with which sensors are contactlessly associated, characterized in that each pick-up is arranged at the two end faces of a radial shaft bearing.

2. The device of claim 1 wherein the pick-ups are disk-shaped.

3. A device of claim 1 wherein the sensors are fixed to the shaft bearing.

4. A device of claim 1 wherein several sensors spaced behind one another in the peripheral direction of the shaft bearing are associated with each pick-up.

5. A device of claim 1 wherein the pick-ups are in the form of two magnetic rings arranged coaxially with the shaft, each one being held in a separate carrier ring fixed at the shaft.

6. A device of claim 5 wherein the carrier rings are disposed within an outer bearing ring of said shaft bearing and have extensions angled outwards in the regions of their bores.

7. A device of claim 6 wherein the two carrier rings are pressed with the angled regions of their bores onto the shaft.

8. A device of claim 6 wherein the carrier rings are located within bearing race rims which are adjacent to the outer bearing ring.

9. A device of claim 8 wherein the sensors are in the form of rod-shaped Hall emitters, each one being fixed with one end in bores of the bearing race rims, the bores being parallel to the shaft axis, and the other end extending into an annular gap of the pick-ups formed by said two coaxial magnetic rings.

* * * * *